Patented June 12, 1934

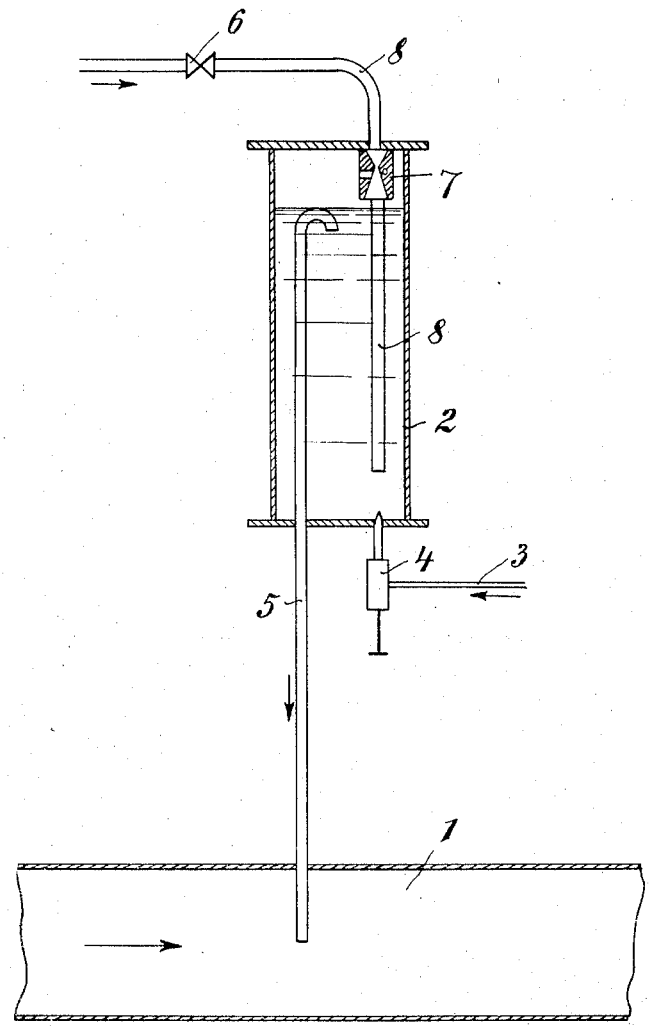

1,962,571

UNITED STATES PATENT OFFICE 1,962,571

DEVICE FOR MAKING AQUEOUS SOLUTIONS OF CHLORINE

Georg Ornstein, Berlin, Germany

Application November 17, 1932, Serial No. 643,109
In Germany February 9, 1932

3 Claims. (Cl. 23—285)

This invention relates to the manufacture of aqueous solutions of chlorine from liquid chlorine and water or waste water and has for its main object to provide for a device which is simple in construction and safe in operation.

A further object of my invention is the provision of an apparatus which enables the continuous manufacture of aqueous solution of chlorine with a uniform chlorine content.

A further object of my invention is the provision of an apparatus which enables the continuous manufacture of aqueous solution of chlorine without losses in chlorine.

A further object of my invention is the provision of an apparatus which enables a fast and complete dissolution of liquid chlorine in water.

Still a further object of my invention is the provision of an apparatus for dissolving liquid chlorine in water without disturbance by formation of chlorine hydrate.

It is known to dissolve liquid chlorine in water or waste water for water purification purposes by mixing water and liquid chlorine in a vessel provided with means for a continuous feed of water and liquid chlorine and with means for a continuous removal of the aqueous solution of chlorine from this vessel. In this known method water and liquid chlorine are fed to the mixing vessel in the same direction of flow. The dissolution of the liquid chlorine in the water is irregular and incomplete, considerable amounts of undissolved gaseous chlorine and crystalline chlorine hydrate being formed, which hydrate often tends to close completely or in part the aperture of the feeding tube for liquid chlorine. The concentration of the chlorine solution obtained by this known process is not uniform.

All these drawbacks are avoided by the invention which consists in an apparatus for dissolving liquid chlorine in water or waste water comprising a closed mixing vessel, into which the water is continuously fed from the top and the liquid chlorine in counter current to the water from the bottom, means being provided for a continuous withdrawal of the solution formed from said vessel.

The annexed drawing shows schematically a preferred embodiment of the apparatus according to the invention, for use in connection with a pipe, through which water or waste water to be purified by chlorine flows.

The water to be treated with chlorine flows through the pipe 1, which may be replaced by an open canal or by a storage tank. The main part of the apparatus for making an aqueous solution of chlorine, to be added to the water in the pipe 1, is a glass cylinder 2 which is closed at both ends by covers of material resistant against chlorine. The nozzle enters the mixing vessel through the bottom cover. A valve 4 is positioned in the tube 3 coming from any usual reservoir for liquid chlorine not shown in the drawing. The nozzle is the preferred form of means for feeding liquid chlorine into the cylinder 2. Its opening is preferably small, having for example a diameter of 1 mm. or only some few mm. The interior bore of this nozzle has in its preferred form a conical shape, the area of the cross section decreasing towards the opening. However, also other means for introducing liquid chlorine such as a tube may be employed. Through the bottom cover of the cylinder 2 enters an overflow pipe 5 for leading chlorine solution formed in the cylinder 2 to the pipe 1, and for maintaining the liquid level in the cylinder at a desired predetermined height, leaving in the cylinder 2 a liquid free space between the liquid level and the lower surface of the top cover. Through the top cover of the cylinder 2 enters a water feeding tube 8 provided with a valve 6. Just below the top cover in the space between the liquid level and the top cover in the cylinder 2 is arranged an injector 7 in the water feeding tube 8, which tube 8 extends into the liquid in the cylinder 2, when the apparatus is in operation.

The described apparatus operates as follows. The valve 6 is opened and water introduced through tube 8 into the cylinder 2. When the water level in the cylinder 2 reaches the height of the overflow pipe 5 excess water flows through pipe 5 into the main water pipe 1, through which the water or waste water to be treated flows. Valve 4 is then opened and liquid chlorine enters the cylinder 2 from below in counter current to the water entering the cylinder 2 from the top, thus effecting a thorough and quick mixing of water and liquid chlorine. Due to the release of pressure taking place when the liquid chlorine enters the cylinder 2 some gaseous chlorine is formed arising slowly through the water column in the cylinder 2. The undissolved part of gaseous chlorine enters into the space above the liquid level in the cylinder and is drawn into the tube 8 by the injector 7 driven by the entering water, thus being mixed thoroughly with water in which it is to be dissolved. If chlorine hydrate is formed by the liquid chlorine entering the water through the nozzle, it is at once removed from the nozzle opening by the turbulent motion of the water in the cylinder, which supports its dissolution in the water. The aqueous solution of chlorine formed in the cylinder 2 is continuously removed from the cylinder by the overflow pipe 5, which leads it to the pipe 1 through which the water or waste water to be treated with chlorine flows.

With the apparatus described 20 cbm of an aqueous solution of chlorine with 0.5% of chlorine may be produced per hour, when the cylinder has a volume of 14 1.20 cbm. of water and 100 kg of liquid chlorine are fed to the cylinder per hour, which shows that there is a very vigorous motion of the liquid in the cylinder.

From the above description it will be seen, that a complete dissolution of liquid chlorine in water is obtained with simple means of small size. The chlorine solution obtained is of uniform strength and no gaseous chlorine may escape.

The foregoing detailed description has been given for clearness of understanding only, and no unnecessary limitations should be understood therefrom, but the appended claims should be construed as broadly as permissible in view of the prior art.

I claim:

1. An apparatus for the preparation of an aqueous solution of chlorine which comprises a mixing chamber closed to the external atmosphere, an inlet conduit for introducing water into said mixing chamber, a second inlet conduit for introducing liquid chlorine into said mixing chamber, an outlet conduit through which the prepared solution is removed from said chamber, said outlet conduit being formed with an inlet opening so positioned in said mixing chamber that the solution in said chamber is maintained at a predetermined level during the operation of the device, the space within said chamber above said predetermined liquid level constituting a gas space, and an injector in said water inlet conduit so positioned in said mixing chamber that any gaseous chlorine present in said gas space is drawn into said water inlet conduit by the action of said injector.

2. An apparatus for the preparation of an aqueous solution of chlorine which comprises a mixing chamber closed to the external atmosphere and formed of a material resistant to the action of chlorine, an inlet conduit for introducing water into said mixing chamber, a second inlet conduit for introducing liquid chlorine into said mixing chamber, an outlet conduit through which the prepared solution is removed from said mixing chamber, said outlet conduit being provided with an inlet positioned in said mixing chamber constituting an overflow pipe, so that the solution present in said chamber is maintained at substantially a predetermined level, excess solution being removed therefrom by means of said outlet conduit when the solution tends to rise above said predetermined level, the space within said chamber above said predetermined liquid level constituting a gas space, and an injector in said water inlet conduit so positioned in said mixing chamber that any gaseous chlorine present in said gas space is drawn into said water inlet conduit by the action of said injector.

3. An apparatus for the preparation of an aqueous solution of chlorine which comprises a mixing chamber closed to the external atmosphere which consists of a glass cylindrical vessel provided with upper and lower closures, an inlet conduit for introducing water into said mixing chamber, said inlet conduit passing through said upper closure, a second inlet conduit for introducing liquid chlorine into said mixing chamber, said second inlet conduit passing through said bottom closure, valve means in said second inlet conduit to regulate the supply of chlorine to said mixing chamber externally of said chamber, an outlet conduit provided with an overflow pipe inlet positioned in said mixing chamber, said outlet conduit passing through said lower closure and serving to draw off any solution in said mixing chamber when the level of said solution exceeds a predetermined level, the space in said mixing vessel above said predetermined level constituting a gas space, and an injector in said water inlet conduit so positioned in said mixing chamber that any gaseous chlorine present in said gas space is drawn into said water inlet conduit through the action of said injector.

GEORG ORNSTEIN.